United States Patent [19]
Burch

[11] 4,301,187
[45] Nov. 17, 1981

[54] PANEL

[75] Inventor: Jack A. Burch, Grand Forks, Canada

[73] Assignee: Jack A. Burch Ltd., Grand Forks, Canada

[21] Appl. No.: 87,112

[22] Filed: Oct. 22, 1979

[30] Foreign Application Priority Data

Sep. 26, 1979 [CA] Canada .................................. 336368

[51] Int. Cl.³ .......................... B05D 3/02; B05D 5/00
[52] U.S. Cl. .................................. 427/45.1; 427/284; 427/314; 427/317; 427/372.2; 427/393; 427/440; 428/194
[58] Field of Search ...................... 427/45.1, 284, 285, 427/316, 317, 439–442, 372.2, 381, 382, 392, 393, 396, 397, 47, 314; 428/194

[56] References Cited
U.S. PATENT DOCUMENTS 2,694,648 11/1954 Muench .............................. 427/285
4,165,305 8/1979 Sundie et al. .................. 427/45.1 X

FOREIGN PATENT DOCUMENTS 2456031 7/1975 Fed. Rep. of Germany ..... 427/45.1
2500809 7/1975 Fed. Rep. of Germany ...... 427/285
51-109978 9/1976 Japan .................................. 427/284
214346 5/1968 U.S.S.R. ............................. 427/317

Primary Examiner—Bruce H. Hess
Attorney, Agent, or Firm—Townsend and Townsend

[57] ABSTRACT

A method of absorbing resin into part of a panel of particleboard to provide local strength increases in that part. The method comprises subjecting the part to an electric field, immersing the panel in the resin; and then resubjecting the panel to the electric field to cure the resin. A particleboard panel is also disclosed. The panel has a main body with a specific gravity in the range 0.2 to 0.5 but at least one area on its periphery has a specific gravity in the range 0.7 to 1.0. The one area is impregnated with a synthetic resin. The panel is particularly useful in door production as it is strong but cheap.

6 Claims, 1 Drawing Figure

PANEL

FIELD OF THE INVENTION

This invention relates to a method of absorbing resin into a part of a panel of particleboard and to a panel produced using the method.

DESCRIPTION OF PRIOR ART

The present invention has particular application in manufacturing doors. Wooden doors are presently produced by attaching wood or materials such as hardboard and particleboard onto a wooden frame. An inner core of wood, corrugated paper, wood derivatives, polystyrene and the like is used either for sound proofing, thermal insulation or fire resistance. In all cases the door is usually made up of relatively large number of components. The production is thus expensive both in materials and labour.

The use of what might be called artificial wood such as hardboard and particleboard in the production of doors is clearly desirable but has not proved to be a practical solution because of the difficulty of obtaining the necessary strength in such materials. Although it is known to increase the strength of particleboard and hardboard by the absorption of resins it has not previously proved possible to absorb sufficient resin into such a material that it will have the requisite strength for a door. In this regard it should be pointed out that the edges of the door at least must have sufficient strength to hold a screw firmly so that door hardware such as locks, door closers and hinges can be mounted. Furthermore, the frame should not be split either in use, for example by vigorous contact, or in production. The door should not warp nor should it delaminate. It should have reasonable sound proofing and, in order to comply with local codes, must meet certain fireproofing standards.

SUMMARY OF THE INVENTION

Accordingly the present invention seeks to provide a panel of particleboard that is particularly useful in the production of doors. In particular the method according to the present invention provides, by a mechanism not yet understood, for the absorption of large quantities of resin into a predetermined part of a particleboard panel. The resulting material is sufficiently strong to meet all the necessary requirements for a door, including being able to pass a number of fire door endurance ratings.

Thus, in a first aspect, the present invention is a method of absorbing resin into a predetermined part of a panel of particleboard to provide strength increase in the predetermined part, the method comprising subjecting the predetermined part to an electric field; immersing the panel in the resin; and resubjecting the panel to the electric field to cure the resin.

In a second aspect the invention is a particleboard panel comprising a main body having a specific gravity in the range 0.2 to 0.5 with at least one area on its periphery having a specific gravity in the range 0.7 to 1.0, the said one area being impregnated with synthetic resin.

The panels find particular use as doors. For use as a door it can be desirable to provide facing material, for example of veneer, or vinyl material or any other known type of finishing material.

BRIEF DESCRIPTION OF DRAWINGS

The panel according to the invention is illustrated in the accompanying drawings in which:

The FIGURE is a perspective view, partially broken away, of a panel according to the invention.

DESCRIPTION OF THE PREFERRED EMBODIMENTS

Figure 1:
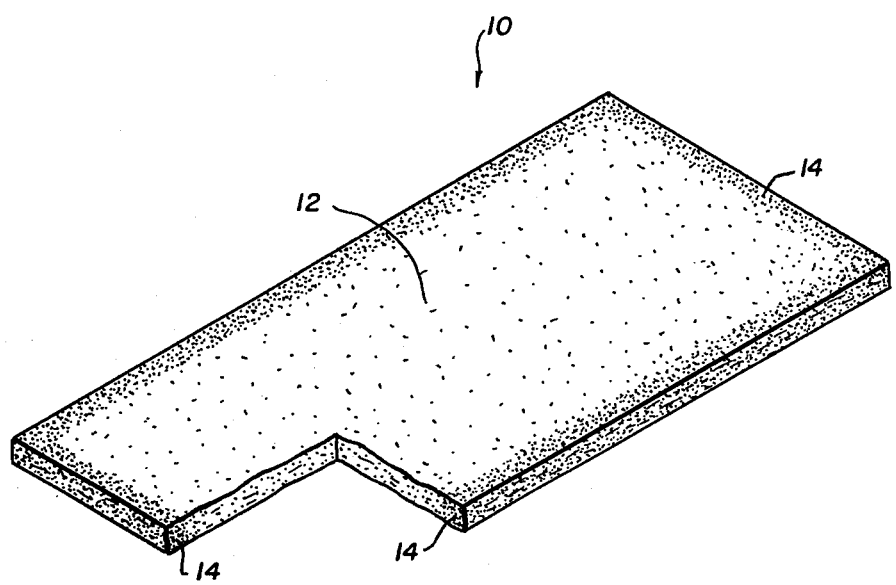

The drawing shows a panel 10 having a central region 12 substantially unaltered by subjecting to the process of the present invention although it may, of course, have a surface coating of resin. However, the edge 14 is made considerably denser. Experiments on a panel according to the present invention have indicated that the normal particleboard, which typically has a specific gravity in the range 0.2 to 0.5, may have a specific gravity at the parts treated by the method according to the present invention in the range 0.7 to 1.0.

Further aspects of the invention are illustrated in the following example.

A particleboard door core of ½" thickness and with a specific gravity of 0.448 was positioned between two metal plates, as electrodes, connected to a generator. The generator was capable of developing 12 kilowatts of power. The generator was switched on and the periphery of the panel, to a width of about 2 inches, was subjected for 1½ minutes to the discharge between the electrodes. The temperature was recorded and reached a maximum of 225° F.

After treatment for 1½ minutes the panel was immersed in a urea formaldehyde resin for 15 minutes. The impregnated board was then re-exposed to the electric discharge for fifteen minutes. This last step is largely to cure the resin.

The product was a panel suitable for use as a door in which the inner section, that is the section not subjected to the electric field, has a specific gravity of about 0.5, that is largely unaltered from the original specific gravity. However, the edges, that is the two inch periphery that had been subjected to the electric discharge, had a specific gravity of about 0.88. These edges permitted the use of a panel as a door. In particular the edges provided excellent screw holding. Furthermore, the panel passed the 20 minute fire door endurance rating as defined in the following tests.

ULCS104, UL10 (B); NFPA252 and ASTNE152.

The panel was mounted with hinges and was also provided with a finished surface in the form of wood veneer. The necessary locks or catches were inserted at the edge remote from the hinge edge and a door of excellent strength, excellent fire resistance and good sound insulation was produced. It should be noted that the product was produced at low material cost, low labour cost and that it had an excellent surface for the retention of paint, that is before the application of the veneer. The ability of the edges to hold the necessary screws was excellent. The door frame could not be split and did not warp. As the door is of one piece construction it is not possible for delamination of the face or of the frame to take place.

Urea formaldehyde resin was used. However, similar results have been obtained with melamine formaldehyde resin with phenol formaldehyde resin and isocyanates.

I claim:

1. A method of absorbing resin into a predetermined part of a panel of particleboard to provide local strength increases in the predetermined part, the method compromising preheating the predetermined part by subjecting the part to an electric field;
   immersing the panel in the resin; and
   resubjecting the panel to the electric field to reheat the predetermined part to cure the resin.

2. A method as claimed in claim 1 in which the resin is selected from urea formaldehyde, phenol formaldehyde melamine resins and isocyanates.

3. A method as claimed in claim 1 in which the particleboard has a specific gravity in the range 0.2 to 0.5 which is increased at the predetermined parts to a specific gravity in the range 0.7 to 1.0.

4. A method as claimed in claim 1 in which the electric field is produced between metal plates connected to a high power electric source and the predetermined parts of the board are positioned between the plates.

5. A method as claimed in claim 4 in which the high power is about 12 kilowatts.

6. A method as claimed in claim 1 in which the panel is for use as a door and the predetermined parts are at least the parts to receive door hardware selected from hinges, locks and closers.

* * * * *